US010017978B2

(12) United States Patent
Thiele et al.

(10) Patent No.: US 10,017,978 B2
(45) Date of Patent: Jul. 10, 2018

(54) METHODS AND APPARATUS FOR OVERRIDING POWERED VEHICLE DOOR

(71) Applicant: Honda Motor Co., Ltd., Tokyo (JP)

(72) Inventors: Steven R. Thiele, Marysville, OH (US); Erik Anderson, Marysville, OH (US); Brandon Roeder, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 15/072,163

(22) Filed: Mar. 16, 2016

(65) Prior Publication Data

US 2017/0268277 A1 Sep. 21, 2017

(51) Int. Cl.
*E05F 15/00* (2015.01)
*E05F 15/632* (2015.01)
*E05F 11/54* (2006.01)
*B60J 5/06* (2006.01)

(52) U.S. Cl.
CPC ............... *E05F 15/632* (2015.01); *B60J 5/06* (2013.01); *E05F 11/54* (2013.01); *E05Y 2201/43* (2013.01); *E05Y 2900/531* (2013.01)

(58) Field of Classification Search
CPC ............. E05F 15/632; E05F 11/54; B60J 5/06
USPC ........................................... 49/139, 140, 360
See application file for complete search history.

(56) References Cited

U.S. PATENT DOCUMENTS 5,216,838 A * 6/1993 DeLand ..................... B60J 5/06 49/280
5,558,372 A 9/1996 Kapes et al.
5,639,130 A 6/1997 Rogers, Jr. et al.
5,876,087 A 3/1999 Kleefeldt et al.
6,050,028 A * 4/2000 Nishimura ................. B60J 5/06 49/280
6,231,113 B1 5/2001 Armbruster et al.
6,321,488 B1 11/2001 Bigoszewski et al.
6,422,615 B1 * 7/2002 Roos ....................... E05B 81/20 292/201
6,435,600 B1 * 8/2002 Long .......................... B60J 5/06 296/155
6,464,287 B2 * 10/2002 Rogers, Jr. ................. B60J 5/06 296/155

(Continued)

OTHER PUBLICATIONS

2010 Honda Odyssey, "Sliding Doors", pp. 162-164, 'http://techinfo.honda.com/rjanisis/pubs/OM/HH1010/HH1010OM.pdf'.

*Primary Examiner* — Jerry E Redman
(74) *Attorney, Agent, or Firm* — Kenealy Vaidya LLP

(57) ABSTRACT

Some embodiments are directed to a vehicle door assembly that includes a vehicle door, which defines an interior and is connected to the motor by the linkage, such that actuation of the actuator engages the motor, which thereby moves the vehicle door via the linkage. The vehicle door assembly also includes a powered door override. At least a portion of the powered door override can be disposed within the interior of the vehicle door. The powered door override is configured to disconnect the linkage from the motor so as to isolate the motor from the vehicle door and thereby enable the vehicle door to be moved manually. An interior panel is connected to the vehicle door so as to cover at least a portion of the interior of the vehicle door, such that the powered door override is at least partially enclosed between the interior panel and the vehicle door.

19 Claims, 7 Drawing Sheets

(56) References Cited

U.S. PATENT DOCUMENTS

| | | | | |
|---|---|---|---|---|
| 6,481,783 | B1 * | 11/2002 | Rogers, Jr. | B60J 5/06 296/155 |
| 6,539,670 | B2 * | 4/2003 | Haag | E05F 15/646 49/139 |
| 6,575,864 | B1 * | 6/2003 | Dean | E05F 15/638 475/5 |
| 6,659,539 | B2 * | 12/2003 | Yogo | B60J 5/06 296/155 |
| 6,701,671 | B1 * | 3/2004 | Fukumoto | E05B 77/26 292/336 |
| 6,802,154 | B1 * | 10/2004 | Holt | E05F 15/646 49/139 |
| 6,803,733 | B1 * | 10/2004 | Shabana | E05F 11/486 296/146.11 |
| 6,938,921 | B2 | 9/2005 | Fisher | |
| 7,144,068 | B2 * | 12/2006 | Oxley | B60J 5/06 296/155 |
| 7,261,338 | B2 | 8/2007 | Spurr | |
| 7,472,628 | B2 | 1/2009 | Oberheide | |
| 7,997,639 | B2 * | 8/2011 | Yokomori | E05F 15/646 296/146.4 |
| 8,484,893 | B2 * | 7/2013 | Hayakawa | F16D 43/02 192/103 C |
| 8,505,241 | B2 * | 8/2013 | Kusunoki | E05B 81/76 296/146.4 |
| 8,794,688 | B2 * | 8/2014 | Mather | B60J 5/06 296/78.1 |
| 2001/0022049 | A1 * | 9/2001 | Clark | B60J 5/06 49/360 |
| 2002/0043818 | A1 * | 4/2002 | Fukumoto | E05F 15/646 296/155 |
| 2003/0025337 | A1 * | 2/2003 | Suzuki | E05B 81/20 292/195 |
| 2007/0132273 | A1 * | 6/2007 | Suzuki | E05B 81/20 296/155 |
| 2016/0201361 | A1 * | 7/2016 | Hanaki | E05B 81/16 292/200 |
| 2016/0251888 | A1 * | 9/2016 | Makino | E05B 81/20 49/280 |
| 2017/0174054 | A1 * | 6/2017 | Okuma | B60J 5/06 |

* cited by examiner

METHODS AND APPARATUS FOR OVERRIDING POWERED VEHICLE DOOR

BACKGROUND

The disclosed subject matter relates to methods and apparatus for overriding a powered vehicle door. More particularly, the disclosed subject matter relates to methods and apparatus that override powered mechanisms, such as motors, that move or actuate vehicle doors between open and closed (or latched and unlatched) positions to permit manual door actuation.

Many types of vehicles, such as those that travel on land, through water, by air, etc. define doors for various purposes, such as to allow ingress and egress of vehicle occupants, loading or unloading of cargo, etc. Some such vehicles include a single door, while others may include multiple doors. Exterior doors can be configured to be opened and closed so that when they are opened, an occupant can enter and exit the vehicle (or cargo can be loaded/unloaded), while when they are closed, the occupant (or cargo) is confined within the vehicle. Interior doors can be used to define discrete spaces within the vehicles, such as in the case of doors that define restrooms, vehicle operator compartments, storage compartments, etc., of trains, boats, airplanes, etc.

Many exterior and interior doors involve at least two discrete operations. For example, the doors are movable between a fully open position and a closed position (or a position adjacent the closed position). The doors can also be actuated from their closed position (or adjacent the closed position) to a latched condition that, to some extent, impedes opening of the door. This latched condition can reduce, impede or prevent the door from unintentionally opening under various conditions, such as during vehicle movement.

SUMMARY

The structure of vehicle doors tends to vary based on their desired application, function, etc. In addition, vehicle doors can be configured for different types of operation. For example, some vehicle doors are entirely manually operated, such that a user (e.g., vehicle occupant, etc.) needs to manually operate an actuator to actuate the door between open and closed positions, and/or latched or unlatched conditions. Other vehicle doors can be at least partially actuated between open and closed positions (and/or latched or unlatched conditions) by a motor (such as an electric motor).

In some cases, a single system or motor can be used for this actuation, while in other cases multiple systems (some of which may include motors) can be involved. In one such example, a main drive motor (of a main drive system) can be used to move the door between a fully open position and a closed position or a position adjacent the closed position, i.e., to provide powered movement longitudinally (in a longitudinal direction of the vehicle) such as along an elongated track system. A second system (which may be a cinching drive system) can be used to finish the closing and perform latching of the door. This cinching drive system can include a powered latch that includes a latching/cinching motor that is configured to actuate a partially closed door into a fully closed and latched condition. In some cases, the main drive system moves the door longitudinally along a track, while the cinching drive system moves the door laterally. However, as indicated above, in other cases a single system and/or motor can be used to perform all of the above operations.

Various types of actuators can be used to actuate the motor(s) to initiate powered movement/latching of the door. Some actuators can be operated at or on the vehicle, such as in the case of door levers, handles, buttons, etc., while other actuators can operate wirelessly, such as via key FOBs. Additional devices can be provided that affect operation of the actuators and operation of the motor(s), such as locks or other safety devices that prevent or otherwise impede unlatching and/or opening of the doors under certain circumstances, such as during movement of the vehicle, etc. For example, activation of the lock/safety devices impedes or prevents unlatching and/or opening of the door, while deactivation enables the door to be unlatched and/or opened.

Doors that are powered by motors (such as motors that are part of the main drive system and/or the cinching drive system) can be advantageous for various reasons, such as to make it easier (such as ergonomically) for users to actuate the doors between open and closed positions, and/or latched and unlatched conditions. For example, the user may only need to actuate an actuator, which activates a motor to powered door movement and or latching/unlatching, instead of the user being required to manually move and/or latch/unlatch the door.

However, one disadvantage of these powered systems is that the motor(s) and/or other powered components are subject to failure under a variety of circumstances, such as resulting from collisions, prolonged usage and/or wear, design defects, etc. Under these circumstances (powered component failure), it may be difficult or impossible for a user to latch/unlatch and/or open/close the door. For example, if the door is open when the failure occurs, then it may be difficult or impossible to close and/or latch the door. Conversely, if the failure occurs when the door is closed, then it may be difficult or impossible to unlatch and/or open the door.

Thus, it may be beneficial to provide methods and apparatus for enabling vehicle doors to be manually operated (such as latching/unlatching, and/or opening/closing) upon failure of any of the powered systems (e.g., the main drive system and/or the cinching drive system). In particular, it may be beneficial to provide methods and apparatus that disengage a failed motor and/or other powered components from elements of the door and/or latch assembly (such as to isolate the motor/powered components from the door/latch) to enable the door/latch to be manually operated.

Embodiments are intended to include or otherwise cover any and all methods and apparatus for performing or achieving this isolation, which is also referred to herein as powered vehicle door override. It may be beneficial for these methods and apparatus to achieve this powered vehicle door override regardless of the door position, i.e., fully open, fully closed and latched, partially open, etc. It may also be beneficial to configure and/or dispose any such powered vehicle door override apparatus so as to impede, reduce or prevent unintended actuation of the apparatus, and/or to otherwise configure and/or dispose such apparatus so as to impede, reduce or prevent wear, damage, etc. of the apparatus.

Some embodiments are therefore directed to a vehicle door assembly for use with a motor, a linkage connecting the motor to the vehicle door assembly, and an actuator that is configured to engage the motor. The vehicle door assembly can include a vehicle door that defines an interior and is connected to the motor by the linkage, such that actuation of the actuator engages the motor, which thereby moves and/or latches/unlatches the vehicle door via the linkage. The vehicle door assembly can also include a powered door override, at least a portion of which being disposed within the interior of the vehicle door. The powered door override can be configured to disconnect the linkage from the motor so as to isolate the motor from the vehicle door and thereby enable the vehicle door to be moved and/or latched/unlatched manually. An interior panel can be connected to the vehicle door so as to cover at least a portion of the interior of the vehicle door, such that the powered door override is at least partially enclosed between the interior panel and the vehicle door.

Some other embodiments are directed to a powered vehicle door assembly that includes a motor, a linkage, an actuator configured to engage the motor, and a vehicle door defining an interior and being connected to the motor by the linkage, such that actuation of the actuator engages the motor, which thereby moves and/or latches/unlatches the vehicle door via the linkage. The vehicle door assembly can also include a powered door override, at least a portion of which being disposed within the interior of the vehicle door. The powered door override can be configured to disconnect the linkage from the motor so as to isolate the motor from the vehicle door and thereby enable the vehicle door to be moved and/or latched/unlatched manually. An interior panel can be connected to the vehicle door so as to cover at least a portion of the interior of the vehicle door, such that the powered door override is at least partially enclosed between the interior panel and the vehicle door.

Still other embodiments are directed to a method of manufacturing a vehicle door assembly for use with a motor, a linkage connecting the motor to the vehicle door assembly, and an actuator that is configured to engage the motor. The method can include: connecting a vehicle door, which defines an interior, to the motor by the linkage, such that actuation of the actuator engages the motor, which thereby moves and/or latches/unlatches the vehicle door via the linkage; disposing at least a portion of a powered door override within the interior of the vehicle door; configuring the powered door override to disconnect the linkage from the motor so as to isolate the motor from the vehicle door and thereby enable the vehicle door to be moved and/or latched/unlatched manually; and connecting an interior panel to the vehicle door so as to cover at least a portion of the interior of the vehicle door, such that the powered door override is at least partially enclosed between the interior panel and the vehicle door.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Certain embodiments of a powered door override 20 are disclosed below, and FIGS. 1-6 illustrate some of these embodiments. However, embodiments are intended to include or otherwise cover many different embodiments and structures for decoupling motors from vehicle door assemblies to enable manual actuation thereof.

The embodiments are disclosed below in the context of a slide door of an automobile, and in particular a minivan. However, the embodiments are intended to be applicable to any automobile door assembly, any type of automobile, and any type of vehicle, and to further be applicable to both exterior and interior doors.

Embodiments are also disclosed below in the context of a multiple motor system that powers the door. In disclosed embodiments, a main drive motor can be used to move the door between a fully open position and a closed position or a position adjacent the closed position, i.e., to provide powered movement longitudinally such as along an elongated track system. A cinching and latching motor can be used to cinch the door closed and perform latching, configured to actuate a partially closed door into a fully closed and latched condition. In the disclosed multiple motor system, the main drive system moves the door longitudinally along a track, while the cinching drive system moves the door laterally. However, embodiments are intended to include or otherwise cover any type or number of actuation devices for vehicle doors, including assemblies of single systems and/or motors that actuate doors, such as between both open and closed positions and latched and unlatched conditions, etc.

I. Overall Vehicle

Figure 1:
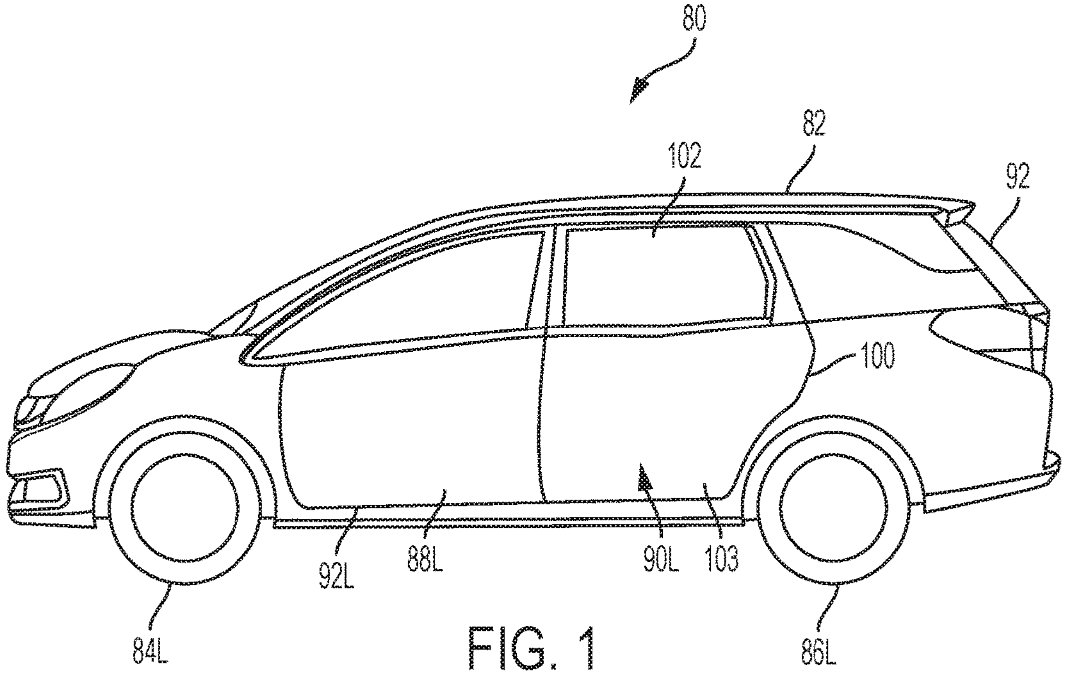
FIG. 1 is a side view of a vehicle with a slide door assembly in a closed position in accordance with the disclosed subject matter.
Figure 2:
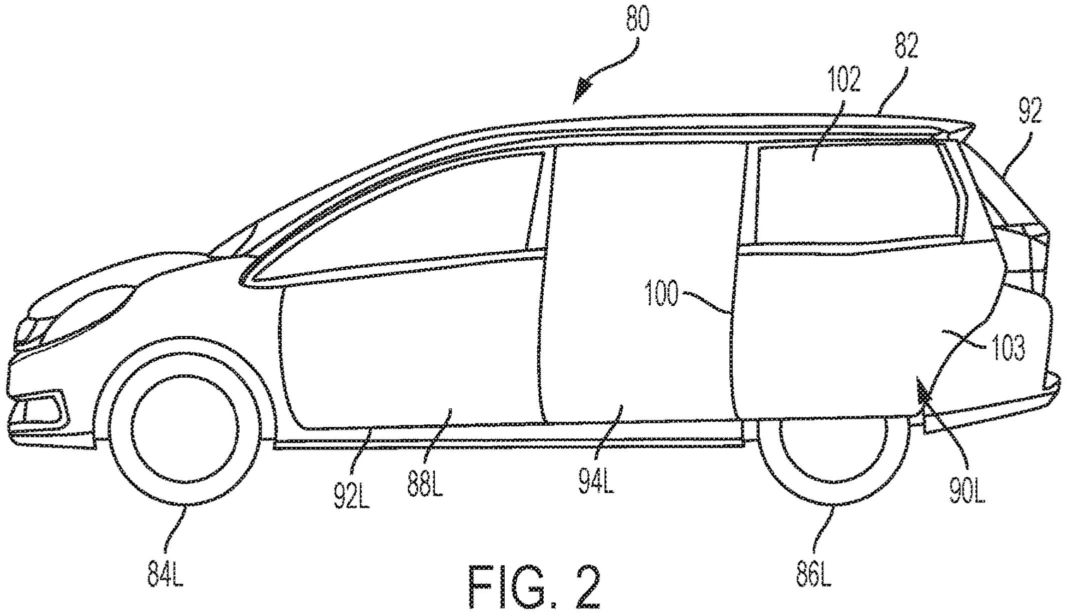
FIG. 2 is a side view of the vehicle and slide door assembly of FIG. 1 in an open position.

FIG. 1 is a side view of a vehicle with a slide door assembly in a closed position in accordance with the disclosed subject matter; and FIG. 2 is a side view of the vehicle and slide door assembly of FIG. 1 in an open position. The vehicle 80 shown in FIGS. 1 and 2 is primarily for use on paved roadways, and can be referred to as a passenger vehicle, and in particular is a minivan. However, as indicated above, the disclosed powered door override 20 can be used with any vehicle that is configured for travel along any one or combination of improved, unimproved, and unmarked roadways and paths constituted by gravel, dirt, sand, etc. For example, embodiments are intended to include or otherwise cover any other type of automobile, including passenger car, truck, ATV, etc. In fact, embodiments are intended to include or otherwise cover configurations of the powered door override 20 for use in any other type of vehicle, such as an aircraft, boat, ship, train, spacecraft, etc. Some other embodiments can be used in non-vehicular applications, such as for amusement park rides, elevators, or any other situation where occupants are disposed within an enclosed space defined by a powered door for ingress and egress.

The vehicle 80 can include a body 82, a pair of front wheels 84L (the right-side front wheel is obstructed from view), a pair of rear wheels 86L (the right-side rear wheel is obstructed from view), a pair of front door assemblies 88L (the right-side front door assembly is obstructed from view), a pair of slide door assemblies 90L (the right-side slide door assembly is obstructed from view), a tailgate door assembly 96, a frame assembly, and a powertrain. The frame assembly can be a separate assembly that is connected to the body assembly at discrete locations, such as in a body-on-frame construction, or the frame assembly and the body assembly can be integrated as a single unit (also known as a unit body, unibody or monocoque construction). The frame assembly and the powertrain are omitted from FIGS. 1 and 2 for simplicity and clarity of the drawings.

The vehicle 80 can include a pair of front seats and a pair of rear seats mounted in a passenger area of the vehicle 80, or may only include the pair of front seats. The vehicle 80 may also include a pair of third row seats mounted in the passenger area of the vehicle 80 behind the pair of rear seats. Each pair of seats may alternatively be configured as a bench providing two, three, four, or any number of individual seating positions.

The body 82 of the vehicle 80 defines a pair of front door openings 92L (the right-side front door opening is obstructed from view), and a pair of slide door openings 94L (the right-side slide door opening is obstructed from view) through which a passenger may pass in order to enter or exit the vehicle 80. The body 82 also defines a tailgate door opening (the tailgate door opening is obstructed from view) at a rear portion of the vehicle 80.

The door assemblies 88L, 90L, 96 each can include a door and a window panel assembly, and can be configured to selectively open and close access through the respective door openings by moving between a closed position and a fully opened position. In the closed position, the door assemblies 88L, 90L, 96 can span the respective door openings to obstruct access to an interior of the vehicle 80 via the door openings. In the closed position, each door assembly 88L, 90L, 96 can be latched to the body 82 of the vehicle 80. The fully opened position can be any position where the door assemblies 88L, 90L, 96 are moved away from the respective door openings to provide substantially unobstructed access to the interior of the vehicle 80 via the door openings.

In FIGS. 1 and 2, the pair of front door assemblies 88L and the tailgate door assembly 96 are hingedly attached to the body 82 of the vehicle 80, and pivot between open and closed positions. Contrarily, the pair of slide door assemblies 90L of the present embodiment are slideably attached to the body 82 of the vehicle 80, and slide back and forth between opened and closed positions. However, each door assembly may also be configured to be hinged, slidable, or otherwise configured to be opened and closed in any manner so as to provide access through the respective door openings.

In some of the embodiments disclosed below, the front door assemblies 90L and tailgate door assembly 96 are operable to be manually moved between open and closed positions, and to be latched/unlatched when in the closed position. Contrarily, the slide door assemblies 90L are configured for powered movement, i.e., movable under the power of an electric motor. However, embodiments are intended to include or otherwise cover other configurations, such as where all doors are configured for powered movement, where the front doors and not the slide doors are configured for powered movement, etc.

The vehicle of FIGS. 1 and 2 is a minivan, and in some of the embodiments the slide door assemblies 90L are longitudinally longer than the front door assemblies 88L. This configuration may be beneficial because it provides additional room for ingress and egress to and from the rear passenger compartment, which may be occupied by a larger number of vehicle occupants, or may be used to transport a relatively large volume of cargo.

The mechanism for opening the slide door assemblies 90L may be configured to address their relatively longer longitudinal lengths. For example, it may be disadvantageous to open the slide door assemblies 90L using a hinged mechanism because of space constraints, i.e., insufficient space may be provided for opening the doors in a generally lateral direction under certain circumstances (such as in crowded parking lots, garages, etc.). Thus, it may be beneficial to open the doors in a generally longitudinal direction of the vehicle, such as along a longitudinally extending track. In many of these embodiments, in order to open the door from the fully closed position (where the door exterior is generally flush with other adjacent exterior vehicle body panels), the door is first moved a relatively short distance laterally outward, and then is moved longitudinally rearward generally parallel to the adjacent body panel.

II. Door Operation

Figure 3:
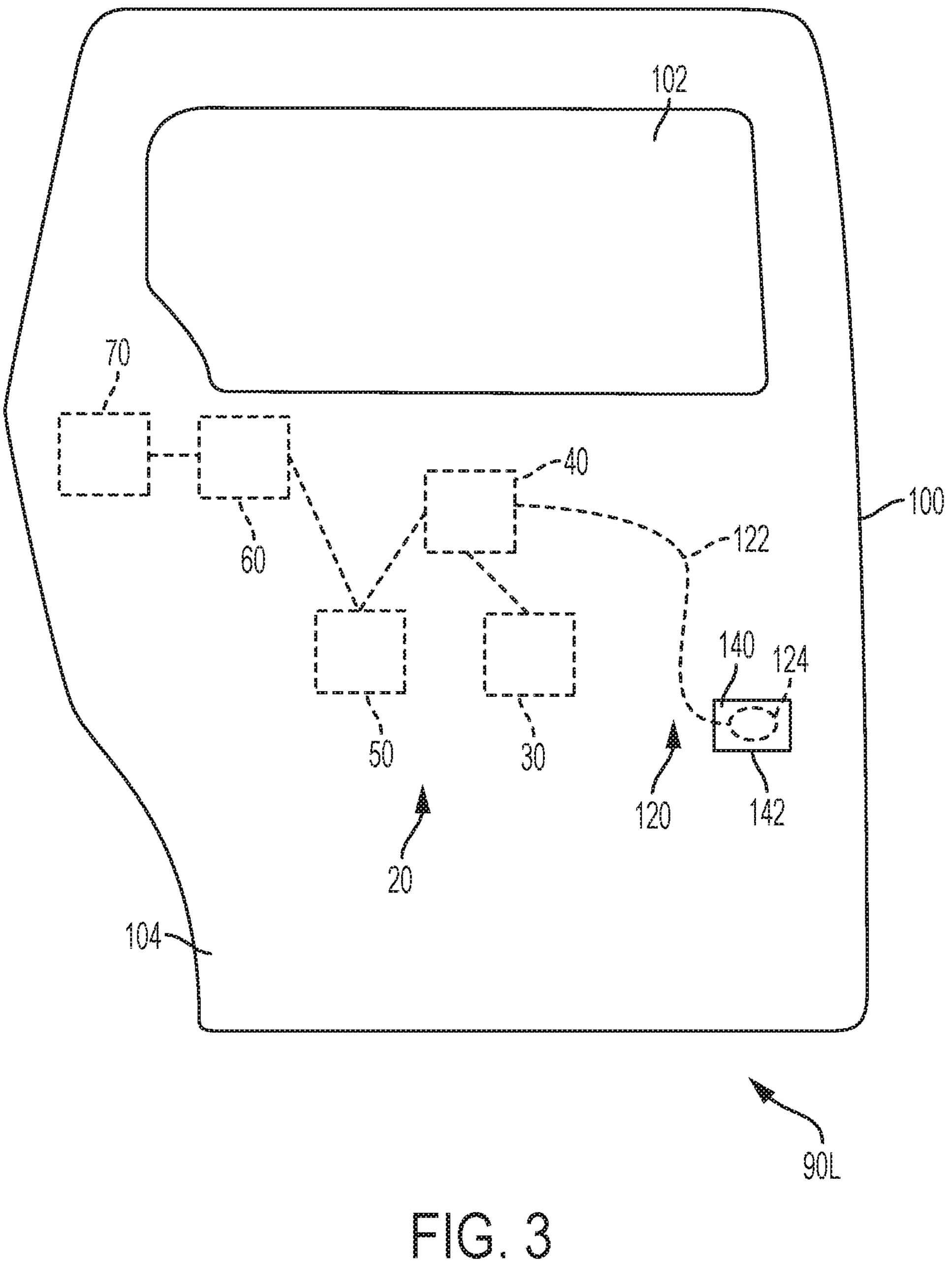
FIG. 3 is a schematic of an interior of the slide door assembly of FIGS. 1 and 2 including a powered door override.

FIG. 3 is a schematic of an interior of the slide door assembly of FIGS. 1 and 2 including a powered door override.

The slide door assembly 90L includes a door perimeter 100 and a window assembly 102 within the door perimeter 100. The slide door assembly 90L may alternatively include a windowless door frame, such as door assemblies commonly used in cargo vehicles.

In the present embodiment, the slide door assembly 90L is configured to be slideably attached to the body 82 of the vehicle 80, thereby sliding between opened and closed positions within the slide door opening 94L. Alternatively, the slide door assembly 90L may be hingedly attached to the body 82 of the vehicle 80, or attached via another opening and closing mechanism.

The slide door assembly 90L can be attached to the body 82 via a set of tracks along which the slide door assembly 90L slides. The set of tracks extend longitudinally along a length of the body 82 of the vehicle 80, traversing a portion of the body 82 that extends a sufficient distance for the slide door assembly 90L to transition between fully opened and closed positions. The slide door assembly 90L is positioned towards a front portion of the set of tracks when in the closed position, and positioned towards a rear portion of the set of tracks when in the opened position. The slide door assembly 90L may also be positioned at an intermediate portion of the set of tracks between the closed and the opened positions constituting a partially opened state.

In the closed position, the slide door assembly 90L spans the respective slide door opening 94L and is latched to the body 82 of the vehicle 80. Once in the closed position, the slide door assembly 90L must first be unlatched before sliding along the set of tracks to the partially opened or fully opened positions. Unlatching the slide door assembly 90L may be achieved via actuation of an interior door handle or an exterior door handle. The slide door assembly 90L may also be unlatched remotely using either an electronic, hydraulic, or pneumatic system, whereby actuation of the system via an input device (i.e., a button) unlatches the slide door assembly 90L without requiring either the interior or exterior door handle to be actuated.

In the partially opened position, the slide door assembly 90L is unlatched from the body 82 and slidable along the set of tracks in either a rearward or a forward direction. The slide door assembly 90L may be slid by manually pushing on portions of the slide door assembly 90L itself, or remotely using either an electronic, hydraulic, or pneumatic system, whereby actuation of the system via an input device (i.e., a button) moves the slide door assembly 90L along the set of tracks without requiring the slide door assembly 90L to be manually pushed.

In the fully opened position, the slide door assembly 90L is positioned at an end portion of the set of tracks farthest from where the slide door assembly 90L latches to the body 82 of the vehicle 80. The fully opened position provides unobstructed access to the interior of the vehicle 80 via the slide door opening 94L. Once in the fully opened position, the slide door assembly 90L may remain freely slidable as in the partially opened position. Alternatively, the slide door assembly 90L may be secured in the fully opened position to prevent or impede accidental sliding. The slide door assembly 90L may be secured in the fully opened position by a latch or alternate mechanism for holding the slide door assembly 90L in place. To move the slide door assembly 90L once it has been secured in the fully opened position, it may be necessary to unsecure the slide door assembly 90L by actuating the interior door handle or the exterior door handle to free the slide door assembly 90L, or by using either an electronic, hydraulic, or pneumatic system, whereby actuation of the system via an input device (i.e., a button) unsecures the slide door assembly 90L.

In the present embodiment, the slide door assembly 90L includes a power release mechanism 30 to power cinching and latching of the slide door assembly 90L to transition between a latched and closed position and an unlatched and partially opened position. As shown in FIG. 3, the slide door assembly 90L includes a power release assembly 30 coupled to a reset assembly 40, the reset assembly 40 then being coupled to an RC assembly 50. Additionally, a reset cable 120, which will be described in more detail below, is connected to the reset assembly 40. The RC assembly 50 is further coupled to an open lever assembly 60, the open lever assembly 60 then being configured to engage a latch assembly 70. The power release assembly 30, reset assembly 40, RC assembly 50, open lever assembly 60 and latch assembly 70 are positioned within an interior of the slide door assembly 90L between an exterior panel 103 and an interior panel 104. Within the interior of the slide door assembly 90L, the power release assembly 30, reset assembly 40, RC assembly 50, open lever assembly 60 and latch assembly 70 are further positioned below the window assembly 102.

The power release assembly 30 drives the reset assembly 40 to engage or disengage the open lever assembly 60 with the latch assembly via the RC assembly 50. In the engaged state, the open lever assembly 60 facilitates the unlatching of the latch assembly 70 such that the slide door assembly 90L is movable. In the disengaged state, the open lever assembly 60 facilitates the latching of the latch assembly 70 such that the slide assembly door 90L is latched in the fully closed position.

Figure 4:
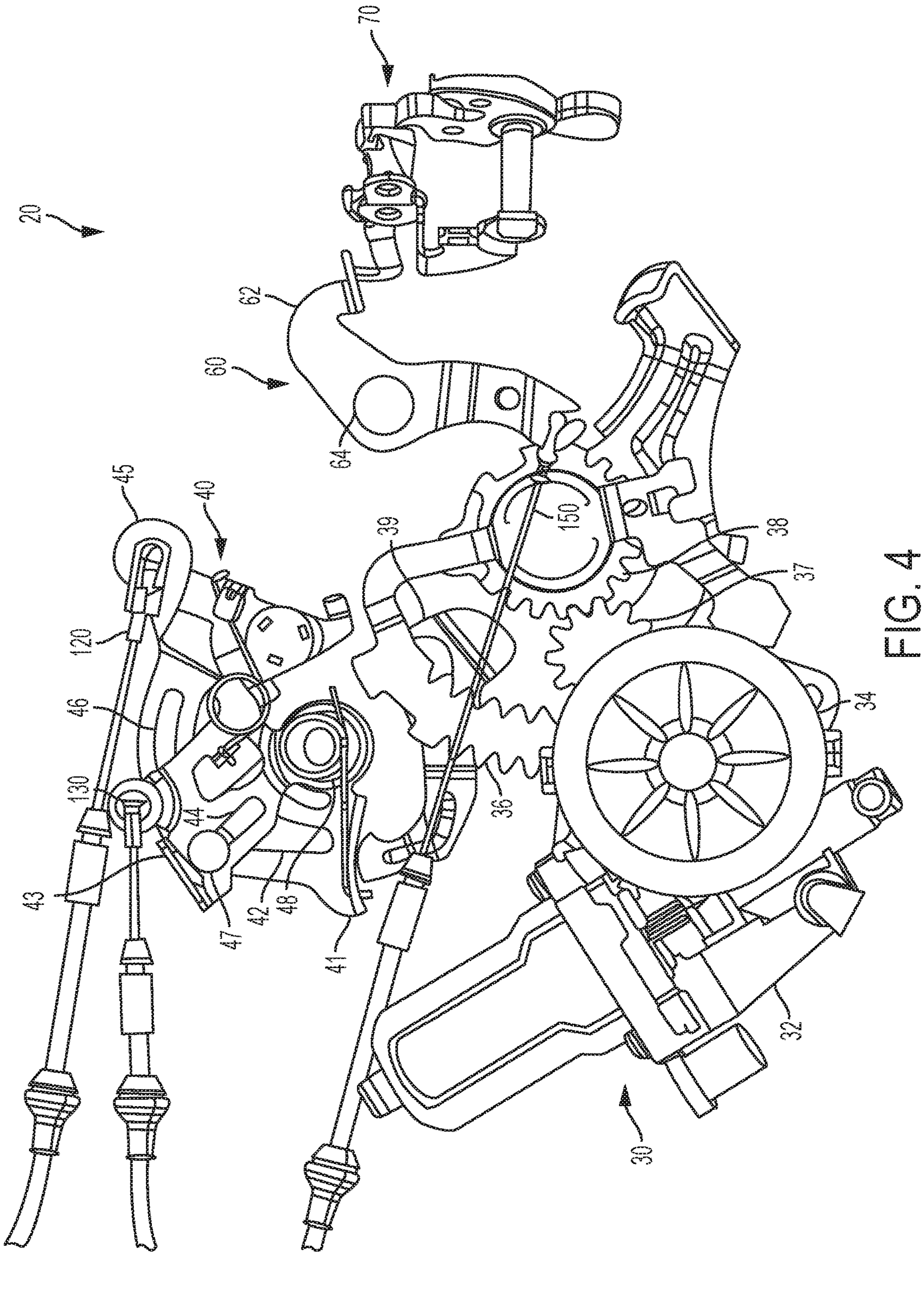
FIG. 4 is a plan view of the powered door override with the slide door assembly in a latched state.

FIG. 4 is a plan view of the powered door override 20 with the slide door assembly 90L in a latched state. In FIG. 4, a release motor 32 of the power release assembly 30 drives a release transmission 34 to drive an input gear 36. The input gear 36 then rotates an idler gear 37, which further drives an output gear 38. The output gear 38 rotates to engage a first pivoting assembly 39, which in turn rotates to contact a second pivoting assembly 41. The second pivoting assembly 41 rotates around a primary pin 48 to engage and move a third pivoting assembly 43, the second pivoting assembly 41 and the third pivoting assembly 43 being connected via a secondary pin disposed within a second pivoting assembly slot 42 and a third pivoting assembly slot 44 that are so disposed. The third pivoting assembly 43 then rotates around the primary pin 48 to slide along a fourth pivoting assembly slot 46 disposed within a fourth pivoting assembly 45. As the third pivoting assembly 43 slides along the four pivoting assembly slot 46, a power release cable 130 connected to the third pivoting assembly 43 is also correspondingly moved. Moving the power release cable 130 causes an open cable 150, which is connected to the open lever assembly 60, to also be moved via the RC assembly 50. Specifically, pulling the power release cable 130 pulls the open cable 150, which then rotates an open lever 62 of the open lever assembly 60 around a lever pin 64. Further, rotating the open lever 62 via pulling the open cable 150 causes the open lever 62 to engage the latch assembly 70, which thereby unlatches the slide door assembly 90L.

With the slide door assembly 90L unlatched, the slide door assembly 90L is moveable to the partially and fully opened positions. Alternatively, to latch the slide door assembly 90L in the fully closed position via the latch assembly 70, the power release mechanism 30 reverses a drive direction, which correspondingly reverses the interaction between the above described elements.

Figure 5:
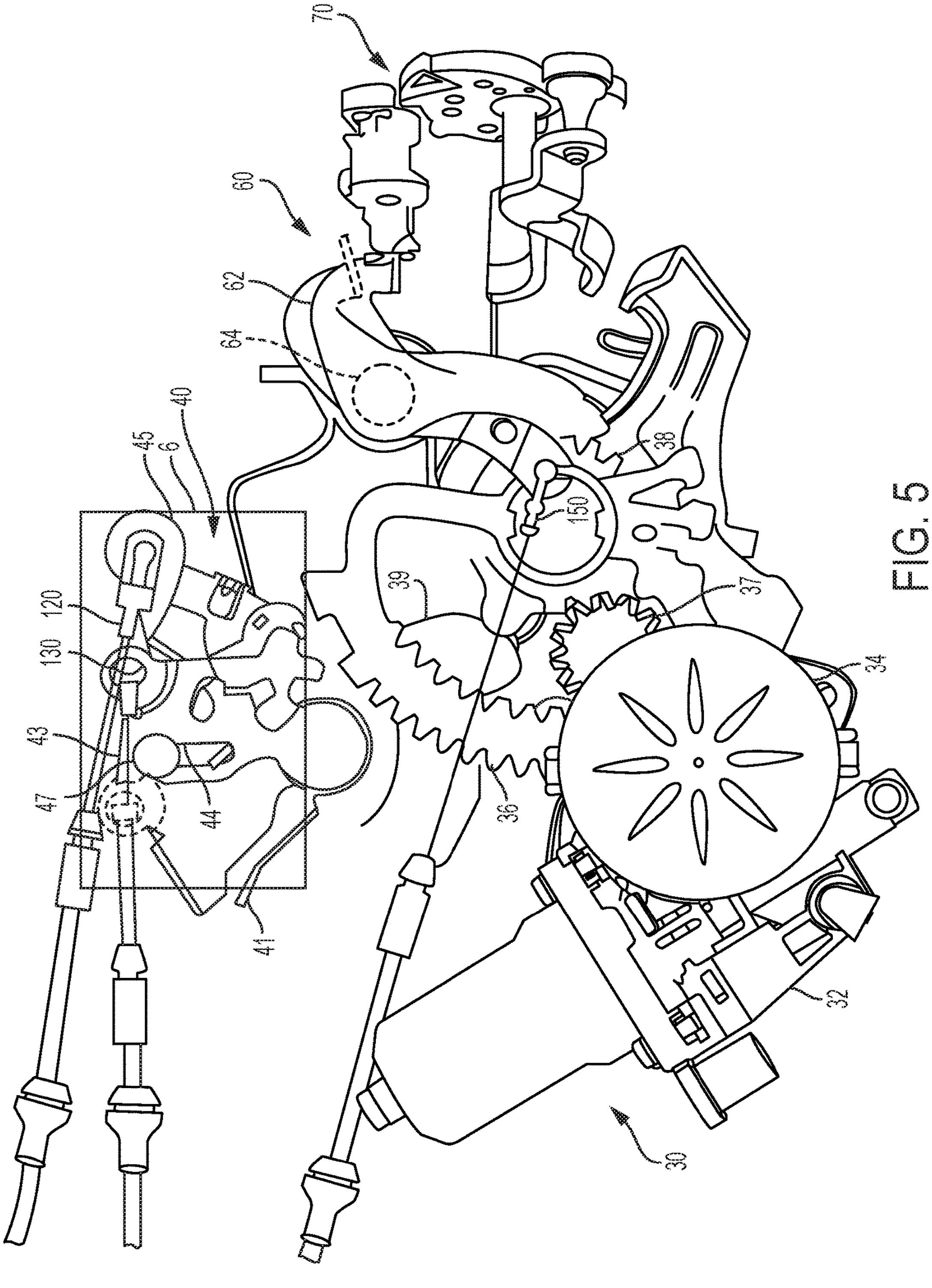
FIG. 5 is a plan view of the powered door override of FIG. 4 with the slide door assembly in an unlatched state.

FIG. 5 is a plan view of the powered door override of FIG. 4 with the slide door assembly in an unlatched state. FIG. 5 therefore shows the above described elements in the state in which the power release cable 130 pulls the open cable 150 via the RC assembly 50 such that the open lever 62 rotates about the lever pin 64 towards the latch assembly 70, thereby disengaging the latch assembly 70 to unlatch the slide door assembly 90L.

Figure 6:
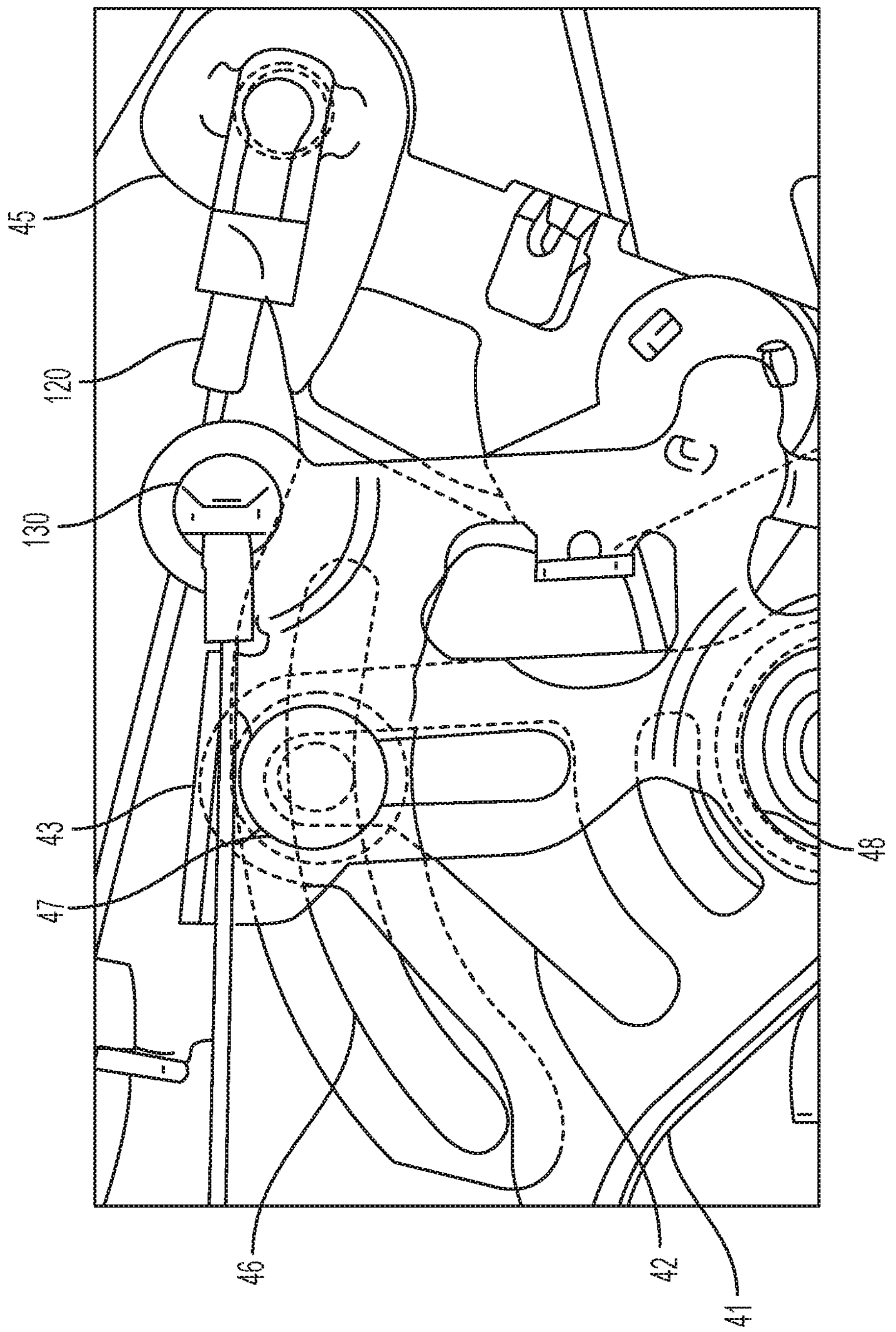
FIG. 6 is a plan view of part of the powered door override of FIG. 5.

FIG. 6 is a plan view of part of the powered door override 20 of FIG. 5. FIG. 6 shows an enlarged view of the second pivoting assembly 41 and connected power release cable 130 slideably engaged with the fourth pivoting assembly slot 46 of the fourth pivoting assembly 45.

Figure 7:
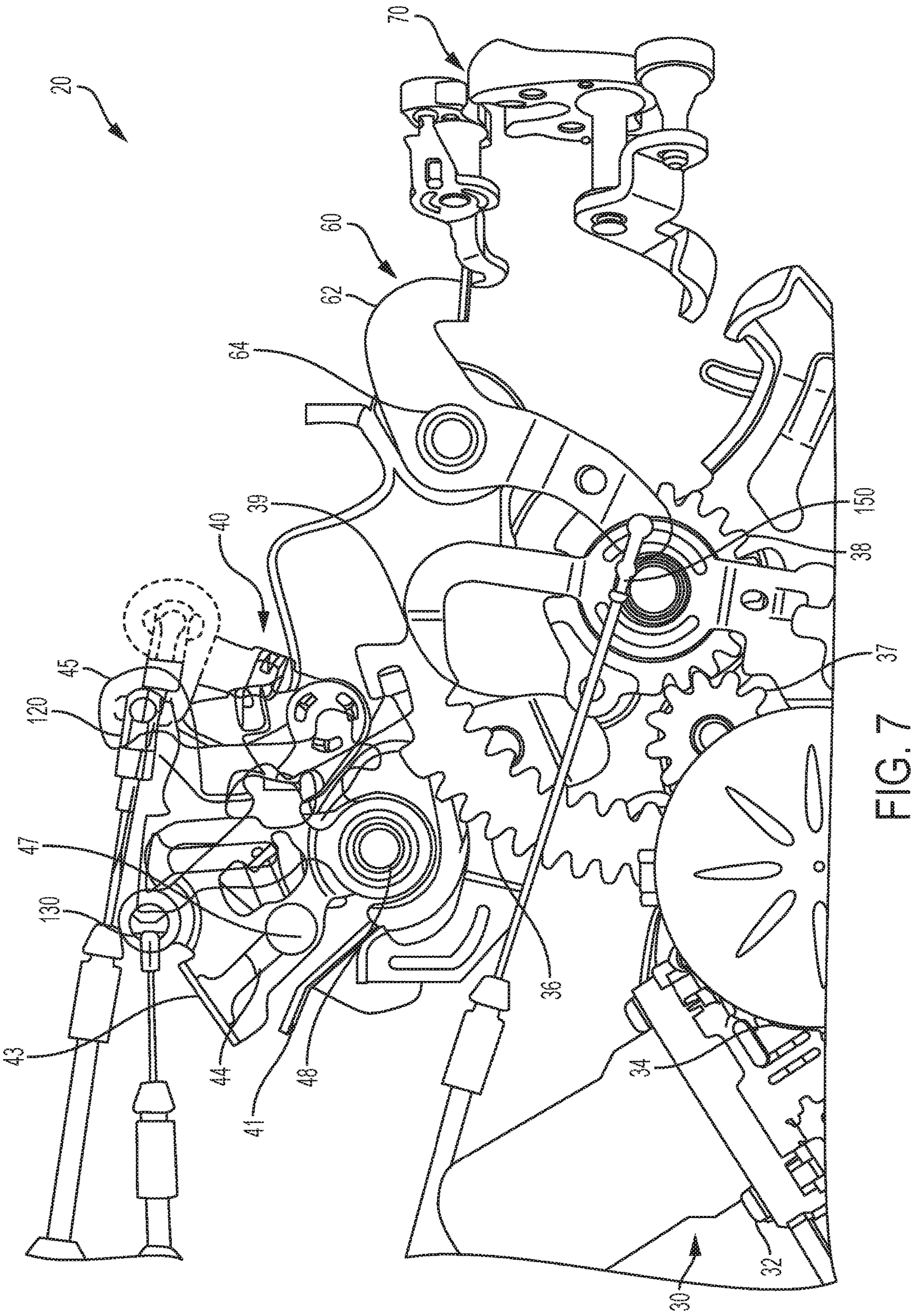
FIG. 7 is a plan view of the powered door override of FIG. 5 with the slide door assembly in an unlatched state and including engagement of a reset assembly.

FIG. 7 is a plan view of the powered door override 20 of FIG. 5 with the slide door assembly 90L in an unlatched state and including engagement of the reset assembly 40. In FIG. 7, the fourth pivoting assembly 45 is shown in an engaged state in which a reset cable 120 has been pulled, for example, by a user pulling the pull end 124 connected to the fourth pivoting assembly 45 via a cable length 122. When pulled, the reset cable 120 is configured to rotate the fourth pivoting assembly 45 and thereby cause the third pivoting assembly 43 and connected power release cable 130 to also move along the fourth pivoting assembly slot 46. Once the third pivoting assembly 43 has moved, the power release cable 130 releases the pull on the open cable 150 via the RC assembly 50 such that the open lever assembly 60 can engage and disengage the latch assembly 70 via manual input such as from actuation of the interior or exterior handles of the slide door assembly 90L. In this state, the power release assembly 30 is decoupled from the latch assembly 70 to bypass potential resistance from the power release assembly 30 in the event of failure of either the release motor 32 or the release transmission 34, or any other component of the power release assembly 30. By pulling the open cable 150, the power release assembly 30 unlatches and/or cinches the slide door assembly 90L to the partially opened position. Powered unlatching of the slide door assembly 90L ensures that all operations of the slide door assembly 90L, including cinching movement, can be motorized.

The above described powered door override 20 may include a single motor or multiple motors configured to perform or provide the power to perform various aspects of slide door assembly 90L operation. For example, a sliding motor may be used to control sliding movement of the slide door assembly 90L, while a cinching motor may be used to control cinching movement and latching and unlatching of the slide door assembly 90L. Alternatively, one motor that includes multiple drive systems may be used to control the various aspects of operation of the slide door assembly 90L. For example, the powered door override 20 may provide power to both a sliding drive system to control sliding movement of the slide door assembly 90L, and a cinching drive system to control latching and unlatching of the slide door assembly 90L.

In motorized door assemblies, a manual override that disengages the motor and permits manual operation of the door assembly can be advantageous in instances of motor failure. Motor failure may occur for a variety of reasons, such as structural damage to the vehicle or components of the vehicle, water damage to the electrical systems of the vehicle, or wear and tear on components of the vehicle. In the instance of motor failure, it is advantageous to be able to manually operate the door assembly to retain use of the door assembly, such as to enable ingress and egress of the vehicle.

In configuring the manual override, spatial constraints of the door assembly must be considered. The manual override must be packaged to conveniently fit within the interior of the door assembly defined between the exterior and interior panels.

Additionally, it may be beneficial for the manual override to be easily identifiable and capable of fast actuation. Manual override operators may range from mechanics to laypersons, and it is conceivable that many vehicle owners and passengers who do not have specialized knowledge of the vehicle will need to operate the manual override. Furthermore, the manual override may need to be operated during a time of emergency, such as an accident or natural disaster. Therefore, the manual override must be easily identifiable to a potential operator so that the operator can quickly locate the manual override in a short amount of time, and even under stressful circumstances. Similarly, the manual override must be quickly actuable and not require excess force or procedures. Each conceivable operator must be capable of actuating the manual override, regardless of strength, education, training, etc.

To preserve operability of the manual override, it is further desirable that the manual override have a covering. The covering serves to impede or prevent accidental actuation of the manual override, such as during instances where the motor has not failed and is working properly. The covering may also protect the manual override from damage by other objects or people, as well as from the elements such as rain and snow. This type of damage may be particularly common when the door assembly is moved into the opened position, and the manual override is no longer disposed within the interior of the vehicle.

The covering of the manual override may provide other benefits, such as improved aesthetics in the form of a sleek covering that would otherwise be defined as an irregular gap in the interior panel of the door assembly. Furthermore, the manual override can be manufactured relatively inexpensively if it is concealed by the covering because the manual override does not need to be aesthetically pleasing or congruent with surrounding designs of the vehicle. Concealment may also provide design flexibility because the covering allows the manual override to be positioned in various locations in the door assembly.

III. Disposition of Disengagement Mechanism

In the present embodiment, the slide door assembly 90L also includes a powered door override 20 to disengage the power release assembly 30 during instances of motor failure. The powered door override 20 is configured to disengage the power release assembly 30 so that the slide door assembly 90L may be manually operated, however the powered door override 20 may alternatively also disengage the power release assembly 30 and engage another motor to maintain powered operated of the slide door assembly 90L.

To disengage the power release assembly 30, the powered door override 20 includes a reset cable 120 configured to disconnect the connecting the power release assembly 30 from the latch assembly 70. Disengaging the power release assembly 30 prevents any output of the power release assembly 30 from transferring to the latch assembly 70, thereby preventing powered operation of the slide door assembly 90L.

With the power release assembly 30 thereby disengaged, the slide door assembly 90L can be operated manually for both cinching and latching/unlatching functions. Manual operation of the slide door assembly 90L involves pushing and pulling the slide door assembly 90L to move between the partially opened and closed positions, and latching and unlatching the slide door assembly 90L via actuation of interior and exterior door handles.

The reset cable 120, which includes the cable length 122, of the powered door override 20 extends within the interior of the slide door assembly 90L and is configured to extend from the reset assembly 40 to a compartment 140 within the slide door assembly 90L.

Figure 8:
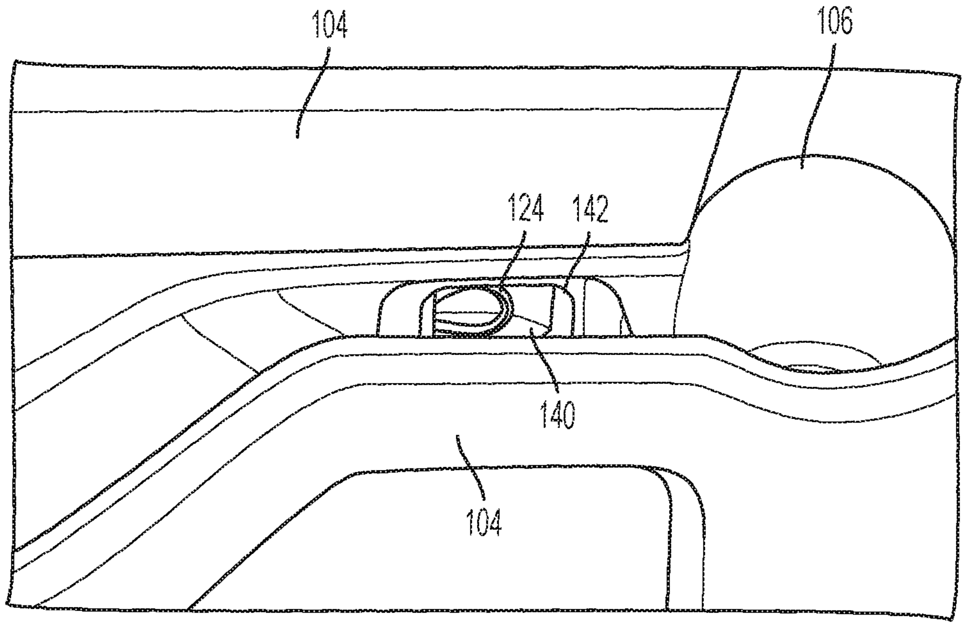
FIG. 8 is a perspective view of a section of the slide door assembly of FIGS. 1 and 2, with an interior panel removed, and thereby exposing a looped end of a reset cable.
Figure 9:
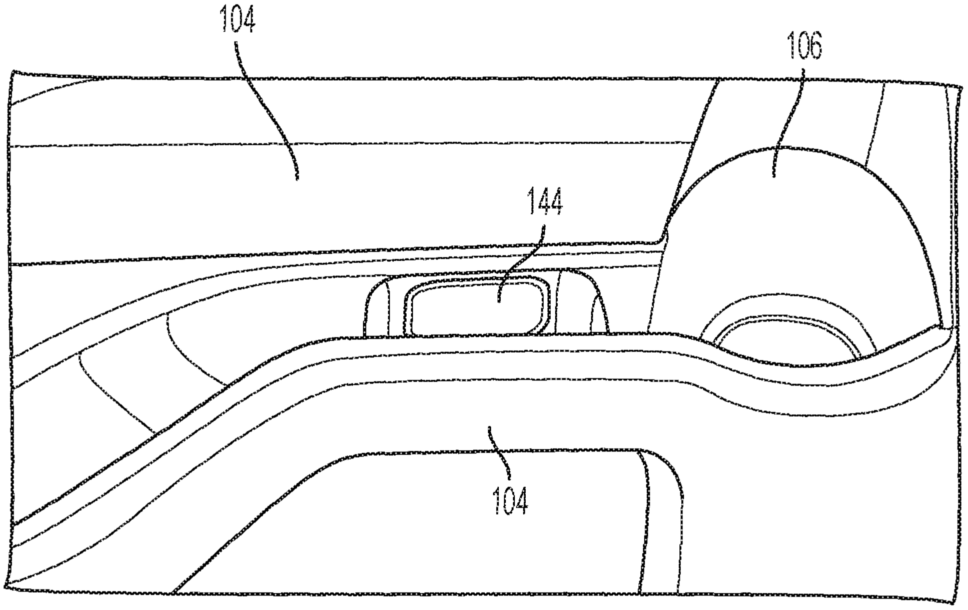
FIG. 9. is a perspective view of a section of the slide door assembly of FIGS. 1 and 2, with the interior panel secured to the door assembly to thereby cover the looped end of the reset cable.

As shown in more detail in FIG. 8, the reset cable 120 includes a pull end 124 at an end opposite the reset assembly 40, the pull end 124 being positioned within the compartment 140. In the present embodiment, the pull end 124 can be configured to be in the shape of a loop, however the pull end 124 may alternatively be in the shape of a tab or any other appropriate shape or structure that can facilitate gripping of the pull end 124 by a person.

The pull end 124 is positioned within the compartment 140 so as to be accessible from the interior of the vehicle 80 during instances of motor failure. Because the compartment 140 is within the slide door assembly 90L, a compartment opening 142 on an interior surface of the slide door assembly 90L provides accessibility to the pull end 124. The compartment opening 142 may be located within an arm rest, cup holder, shelf, pocket, or another structure on the interior surface of the slide door assembly 90L.

Pulling the pull end 124 transfers force of the pull through the cable length 122 and to the reset assembly 40, thereby disengaging the reset assembly 40 and the power release assembly 30 from the latch assembly 70. The pull end 124 may thereby disengage the power release assembly 30 and place the slide door assembly 90L in a state of manual operation.

In the present embodiment, the compartment opening 142 is covered with a compartment panel 144 to conceal the reset cable 120, and specifically the pull end 124. The cable length 122 and pull end 124 are concealed by the interior panel 104 and the compartment panel 144, respectively, to impede or prevent damage to the reset cable 120, and to impede or prevent accidental actuation of the reset cable 120.

The compartment panel 144 is configured to fit the size and shape of the compartment opening 142 so that the compartment opening 142 may be completely covered. The compartment panel 144 is also configured so as to be readily removable from the compartment opening 142 via snaps, ridges, or some other reversible engagement mechanism. Similarly, the compartment panel 144 can be re-engaged with the compartment opening 142 after having been removed to once again cover the compartment opening 142. The reset cable 120 can thereby be at least partially concealed within the compartment 140 during nonuse, while maintaining accessibility through the removable compartment panel 144.

IV. Methods of Operation

In accordance with operation of some of the disclosed embodiments, the powered door override 20 is configured to disengage the power release assembly 30 from the latch assembly 70 by pulling on the pull end 124 of the reset cable 120. The slide door assembly 90L may be latched and in the closed position, or may be in the partially opened position at the time of operation.

To operate the reset assembly 40 of the powered door override 20 via the reset cable 120, the compartment panel 144 must be removed from the compartment opening 142 to expose the interior of the compartment 140 located within the slide door assembly 90L. Once the compartment panel 144 has been removed, the reset cable 120, and more specifically the pull end 124 of the reset cable 120, is accessible.

The pull end 124 of the reset cable 120 is then pulled, thereby disconnecting the latch assembly 70 from the power release assembly 30. At this point, the power release assembly 30 no longer controls cinching movement or latching and unlatching of the slide door assembly 90L, and the slide door assembly 90L may be operated manually. The slide door assembly 90L can thereafter be manually opened and closed, and manually latched and unlatched.

V. Alternative Embodiments

While certain embodiments of the invention are described above, and FIGS. 1-6 disclose the best mode for practicing the various inventive aspects, it should be understood that the invention can be embodied and configured in many different ways without departing from the spirit and scope of the invention.

The embodiments are disclosed in the context of passenger vehicles such as a minivan, however embodiments are intended to include or otherwise cover configurations of the power vehicle door override for use in any other type of vehicle, such as an aircraft, boat, ship, train, spacecraft, etc. Some other embodiments can be used in non-vehicular applications, such as for amusement park rides, elevators, or any other situation where occupants are within an enclosed space having a powered door for ingress and egress.

As disclosed above, embodiments are intended to be used with any type of vehicle. The power source of the vehicle can be an internal combustion engine, an electric motor, or a hybrid of an internal combustion engine and an electric motor.

In the disclosed embodiments, the powered door override is applied to vehicle sliding doors. However, the powered door override could be applied or modified to adjust other types of vehicle doors, such as hinged doors (i.e., a vehicle liftgate). In fact, the powered door override can even have applications to vehicle structures other than doors, such as engine hoods (also known as an engine bonnet), trunk lids (also known as a boot lid), sunroofs, and powered windows.

In exemplary embodiments of the invention, the power vehicle door override includes a cable having a looped end to be pulled. However, any mechanism can be used to manually disengage the door motor, provided the mechanism is accessible from an interior of the vehicle, such as a rod having a handle to be pulled or pushed.

Additionally, the disclosed power vehicle door override includes a removable compartment panel to cover a compartment opening that houses the aforementioned looped end of the cable, thereby impeding or preventing access to the cable from the interior of the vehicle unless the compartment panel is removed. However, the compartment panel can also be slidable, hinged, or otherwise attached to the compartment so as to provide access to the looped end of the cable without being completely detached from the vehicle door. Embodiments are intended to include or otherwise cover any type of panel that is at least partially or entirely removable to provide access to the looped end of the cable. In some embodiments, the panel can be reinstalled after removal, however in other embodiments the panel is not configured to be reinstalled.

Embodiments are also intended to include or otherwise cover methods of using and methods of manufacturing any or all of the elements disclosed above. The methods of manufacturing include or otherwise cover processors and computer programs implemented by processors used to design various elements of the power vehicle door override disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A vehicle door assembly for use with a motor, a linkage connecting the motor to the vehicle door assembly, and an actuator that is configured to engage the motor, the vehicle door assembly comprising:

a vehicle door defining an interior and being connected to the motor by the linkage, such that actuation of the actuator engages the motor, which thereby moves the vehicle door via the linkage;

a powered door override, at least a portion of which being disposed within the interior of the vehicle door, the powered door override being configured to disconnect the linkage from the motor so as to disengage the motor from the vehicle door and thereby enable the vehicle door to be moved manually; and an interior panel connectable to the vehicle door so as to cover an exposed portion of the interior of the vehicle door, such that the powered door override is at least partially concealed by the interior panel.

2. The vehicle door assembly according to claim 1, wherein the powered door override includes a manually actuable end that is configured to be manually actuable to disengage the linkage.

3. The vehicle door assembly according to claim 2, wherein the powered door override includes a cable that connects the manually actuable end to the linkage.

4. The vehicle door assembly according to claim 3, wherein the powered door override is configured to be actuated by manually pulling the manually actuable end so as to increase tension of the cable to thereby disengage the linkage.

5. The vehicle door assembly according to claim 4, wherein the manually actuable end is constituted by a loop of the cable that defines an aperture that is configured to communicate with a user's finger, the manually actuable end and the cable defining a single unitary structure.

6. The vehicle door assembly according to claim 1, wherein the vehicle door includes an armrest that provides an upper surface configured to support a user's arm.

7. The vehicle door assembly according to claim 6, wherein the armrest defines a compartment that constitutes at least a portion of the interior of the vehicle door, and that is configured to house a manually actuable end of the powered door override.

8. The vehicle door assembly according to claim 7, wherein the interior panel is configured to cover the compartment of the armrest.

9. The vehicle door assembly according to claim 8, wherein the interior panel conforms to the upper surface of the armrest so as to define a generally uniform contoured surface.

10. The vehicle door assembly according to claim 1, wherein the interior panel is configured to be manually separated from the vehicle door to thereby expose a manually actuable end of the powered door override.

11. A powered vehicle door assembly, comprising:

a motor;

a linkage;

an actuator configured to engage the motor;

a vehicle door defining an interior and being connected to the motor by the linkage, such that actuation of the actuator engages the motor, which thereby moves the vehicle door via the linkage;

a powered door override, at least a portion of which being disposed within the interior of the vehicle door, the powered door override being configured to disconnect the linkage from the motor so as to disengage the motor from the vehicle door and thereby enable the vehicle door to be moved manually; and an interior panel connectable to the vehicle door so as to cover an exposed portion of the interior of the vehicle door, such that the powered door override is at least partially concealed by the interior panel.

12. The powered vehicle door assembly according to claim 11, wherein the powered door override includes a manually actuable end that is configured to be manually actuable to disengage the linkage.

13. The powered vehicle door assembly according to claim 12, wherein the powered door override includes a cable that connects the manually actuable end to the linkage.

14. The powered vehicle door assembly according to claim 13, wherein the powered door override is configured to be actuated by manually pulling the manually actuable end so as to increase tension of the cable to thereby disengage the linkage.

15. The powered vehicle door assembly according to claim 14, wherein the manually actuable end is constituted by a loop of the cable that defines an aperture that is configured to communicate with a user's finger, the manually actuable end and the cable defining a single unitary structure.

16. The powered vehicle door assembly according to claim 11, wherein the vehicle door includes an armrest that provides an upper surface configured to support a user's arm.

17. The powered vehicle door assembly according to claim 16, wherein the armrest defines a compartment that constitutes at least a portion of the interior of the vehicle door, and that is configured to house a manually actuable end of the powered door override.

18. The powered vehicle door assembly according to claim 17, wherein the interior panel is configured to cover the compartment of the armrest, and is configured to be manually separated from the vehicle door to thereby expose a manually actuable end of the powered door override.

19. The powered vehicle door assembly according to claim 18, wherein the interior panel conforms to the upper surface of the armrest so as to define a generally uniform contoured surface.

* * * * *